United States Patent [19]
Sato

[11] Patent Number: 5,559,635
[45] Date of Patent: Sep. 24, 1996

[54] ZOOM LENS SYSTEM CAPABLE OF CORRECTING IMAGE POSITION

[75] Inventor: Susumu Sato, Chiba, Japan

[73] Assignee: Nikon Corporation, Tokyo, Japan

[21] Appl. No.: 290,300

[22] Filed: Aug. 15, 1994

[30] Foreign Application Priority Data

Aug. 27, 1993 [JP] Japan ................................. 5-235499

[51] Int. Cl.⁶ ........................... G02B 15/14; G02B 27/64
[52] U.S. Cl. ........................................ 359/689; 359/557
[58] Field of Search .................................. 359/689, 554, 359/557, 686, 683

[56] References Cited

U.S. PATENT DOCUMENTS 5,039,211  8/1991  Maruyama ........................... 359/557
5,182,671  1/1993  Kitagishi et al. ..................... 359/557

FOREIGN PATENT DOCUMENTS

1-191113  8/1989  Japan .

*Primary Examiner*—Scott J. Sugarman
*Attorney, Agent, or Firm*—Shapiro & Shapiro

[57] ABSTRACT

A zoom lens system comprises, in the following order from the object side, a first lens group with a negative refractive power and a second lens group with a positive refractive power. When changing the focal length, the distance of an air space between the first lens group and the second lens group is changed. The second lens group has a front group with a positive refractive power and a rear group with a negative refractive power. An image position is changed by shifting at least one lens element of the front group of the second lens group along a direction transverse to the optical axis.

21 Claims, 8 Drawing Sheets

ZOOM LENS SYSTEM CAPABLE OF CORRECTING IMAGE POSITION

BACKGROUND OF THE INVENTION

1. Field of the Invention

The present invention relates to a zoom lens system capable of correcting a change of an image position due to vibrations.

2. Related Background Art

As disclosed in Japanese Patent Laid-Open Application No. 1-191113, there is a zoom lens having two or more lens groups in which a predetermined lens group is shifted in a direction perpendicular to an optical axis to correct a change of an image position due to movement of the hands, vibrations of the zoom lens system, etc. (hereinafter referred to as "vibration correction" or "image position correction").

However, in the above zoom lens, the diameters of lenses of the lens group to be shifted in the direction perpendicular to the optical axis for the image position correction, i.e., the diameters of lenses of the vibration correcting group, are large and the total thickness of the vibration correcting group in the optical axis direction is large. Therefore, a vibration correcting mechanism becomes large in size, so that it is difficult to make the lens barrel compact. Namely, in the conventional vibration correcting zoom lens, the whole photo-optical system becomes large, thereby causing inconveniences in terms of portability and operability.

SUMMARY OF THE INVENTION

It is therefore an object of the present invention to provide a zoom lens system in which miniaturization of a lens barrel can be achieved by decreasing the size of a vibration correcting group and in which portability and operability are excellent.

In order to achieve the above object, a zoom lens system capable of correcting an image position according to a first aspect of the present invention has in the following order from the object side, a first lens group G1 with a negative refractive power and a second lens group G2 with a positive refractive power. When the focal length of the zoom lens system is changed, the distance of an axial air space between the first lens group G1 and the second lens group G2 is changed. The second lens group G2 has, in the following order from the object side, a front group G21 with a positive refractive power and a rear group G22 with a negative refractive power, and at least one lens element of the front group G21 of the second lens group G2 is shiftable so as to traverse the optical axis.

In the zoom lens system capable of correcting the image position according to the first aspect, it is preferable to further provide correcting means for detecting a deviation of the image position caused by the zoom lens system, and correcting the image position by driving the at least one lens element of the front group G21 of the second lens group G2.

Also, in order to achieve the above object, a zoom lens system capable of correcting an image position according to another aspect of the present invention has, in the following order from the object side, a first lens group G1 with a negative refractive power and a second lens group G2 with a positive refractive power. When the focal length is changed, the distance of an axial air space between the first lens group G1 and the second lens group G2 is changed. The second lens group G2 has, in the following order from the object side, a front group G21 with a positive refractive power and a rear group G22 with a negative refractive power and at least one lens element of the front group G21 of the second lens group G2 is shiftable so as to traverse the optical axis. Further, the zoom lens system has a correcting means for detecting a deviation of the image position caused by the zoom lens system and correcting the image position by driving the at least one lens element.

In general, in a zoom lens formed of two groups, e.g., a first lens group G1 with a negative refractive power and a second lens group G2 with a positive refractive power, when aiming at reducing the sizes of interchangeable lenses in an SLR camera system (Single Lens Reflex Camera System), it is advantageous to take into consideration the mechanical structure too.

In the zoom lens having negative-positive type two lens groups of the present invention, an optimum condition for achieving miniaturization of the lens system and enabling the image position correction was found.

It is preferable to provide an actuator in the vicinity of the optical system for performing the image position correction, i.e., in the vicinity of the vibration correcting group as the correcting means for shifting the vibration correcting group in the direction perpendicular to the optical axis. Therefore, as the second lens group G2 is small in the peripheral direction with respect to the optical axis, i.e., the diameters of lenses of the second lens group G2 are small, it is preferable to select the second lens group G2 as the vibration correcting group.

However, if the whole second lens group G2 is made as the vibration correcting group, the actuator becomes large as the total thickness of the lens group constituting the vibration correcting group along the optical axis is large.

In the present invention, the second lens group G2 is constructed of the front group G21 with the positive refractive power and the rear group G22 with the negative refractive power and at least a portion of the front group G21 is shifted in the direction perpendicular to the optical axis for the vibration correction to correct the image position. Thereby, the size of the vibration correcting group in the optical axis direction can be reduced.

The reason why the front group G21 of the second lens group has the positive refractive power and the rear group G22 of the second lens group has the negative refractive power is as follows. That is, when taking into consideration the power arrangement through the whole optical system, by disposing the first lens group G1 with the negative refractive power on the object side and disposing the front group G21 of the second lens group with the positive refractive power and the rear group G22 of the second lens group with the negative refractive power on the image side of the first lens group G1, the whole length of the front group G21 of the second lens group along the optical axis can be shortened to secure the variable distance between the first lens group G1 and the second lens group G2 for changing the focal length in a zooming operation. Further, it is advantageous in respect to the aberration correction and the number of lenses can be decreased.

Also, the reason why the at least one lens element of the front group G21 of the second lens group is made as the vibration correcting group is that in the positive lens group of the negative-positive-negative type optical system, it is easy to select passing positions of light rays for forming an image in the central area of a frame and passing positions of light rays for forming an image in the circumference of the frame by arranging a stop in the vicinity of the positive lens group, thereby making it possible to reduce the diameters of lenses to miniaturize the vibration correcting group in the radial direction.

In order to achieve further preferable imaging performance in the zoom lens system of the present invention, it is preferable to satisfy the following condition (1):

$$0.5 < \phi 2/\phi 21 < 1.5, \quad (1)$$

wherein $\phi 2$: the refractive power of the whole second lens group G2

$\phi 21$: the refractive power of the front group G21 of the second lens group G2.

The condition (1) defines a proper range with respect to the power arrangement of the front group G21 in the second lens group G2.

When the lower limit of the condition (1) is violated, the diameter of the second lens group G2 is enlarged and consequently the diameter of the whole zoom lens system is enlarged. Also, there occurs inconvenience that the Petzval sum becomes large in the negative direction.

On the other hand, when the upper limit of the condition (1) is violated, the Petzval sum becomes large in the positive direction and higher order spherical aberration occurs.

In order to further miniaturize the zoom lens system of the present invention, it is preferable to dispose an aperture stop in the front group G21 of the second lens group G2 or in the vicinity thereof. Thereby, even though the effective aperture of the front lens group G21 of the second lens group is set to an effective aperture (minimum value of the effective aperture) determined by the F-number $F_{NO}$, symmetricalness of marginal rays (i.e. rays passing the margin of the aperture stop) with respect to principal rays (rays passing the center of the aperture stop) on the circumference of the frame becomes good enough. Therefore, the effective aperture of the front group G21 of the second lens group constituting the vibration correcting group can be minimized. Namely, it is possible to miniaturize the vibration correcting group in the radial direction.

Further, in order to achieve more preferable imaging performance in the vibration correcting operation, it is preferable to shift the whole front group G21 of the second lens group as the vibration correcting group in the direction perpendicular to the optical axis.

As mentioned above, in the zoom lens system of the present invention, as the second lens group G2 is divided into the front group G21 and the rear group G22, it is possible to form the front group G21 of the second lens group so as to have the positive refractive power necessary in the second lens group but so as not to have higher order aberrations and it is possible to form the rear group G22 of the second lens group G2 so as to cancel higher order aberrations occurring in the first lens group G1. Therefore, interdependence of higher order aberrations between the front group G21 of the second lens group and the first lens group G1 or the rear group G22 of the second lens group is comparatively small, so it is advantageous to set the whole front lens group G21 of the second lens group as the vibration correcting group for the image position correction.

In order to achieve more preferable imaging performance in the zoom lens system of the present invention, it is preferable to satisfy the following condition (2):

$$0.01 < D/R1 < 0.2, \quad (2)$$

wherein

R1: the radius of curvature of a lens surface of the front group of the second lens group located closest to the image side, D: the axial distance between the aperture stop and the lens surface of the front group of the second lens group located closest to the image side.

When the upper limit of the condition (2) is violated, and when the axial distance D is deemed to be fixed, the radius of curvature R1 becomes small and the higher order spherical aberration becomes too large.

On the other hand, when the lower limit of the condition (2) is violated, and when the axial distance D is deemed to be fixed, the radius of curvature R1 becomes too large so that the change of the field curvature in the vibration correcting operation becomes too large.

DETAILED DESCRIPTION OF THE PREFERRED EMBODIMENTS

Embodiments of the present invention will be described with reference to the accompanying drawings. In each embodiment, as shown in, e.g., FIG. 1, a zoom lens system of the present invention has, in the following order from the object side, a first lens group G1 with a negative refractive power and a second lens group G2 with a positive refractive power. Also, in the zoom lens system of each embodiment, when changing the focal length, the first lens group G1 and the second lens group G2 are shifted in the optical axis direction along respective zoom loci as indicated by arrows in the drawing.

Figure 1:
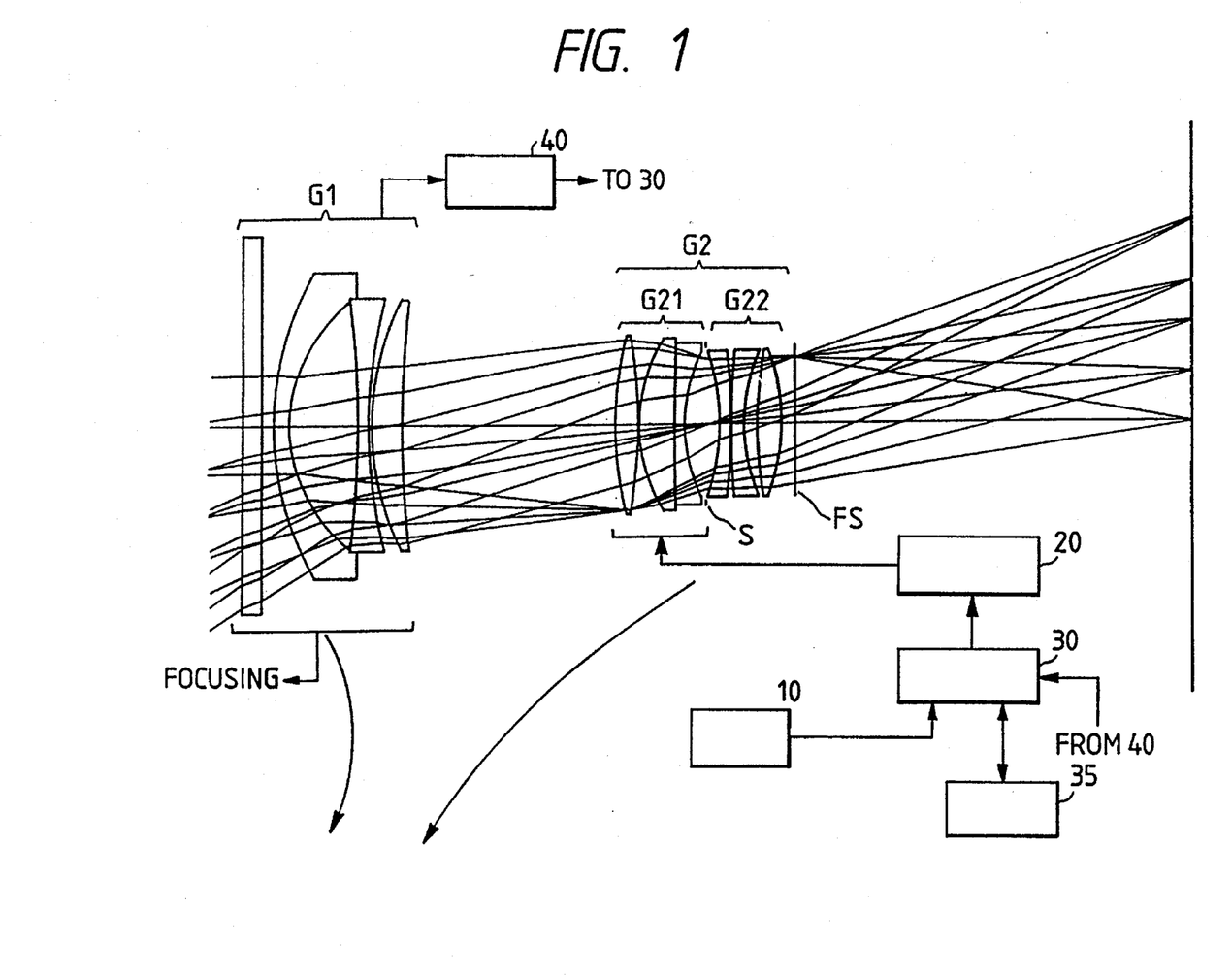
FIG. 1 shows the structure of a zoom lens system according to a first embodiment of the present invention.
Figure 2A:
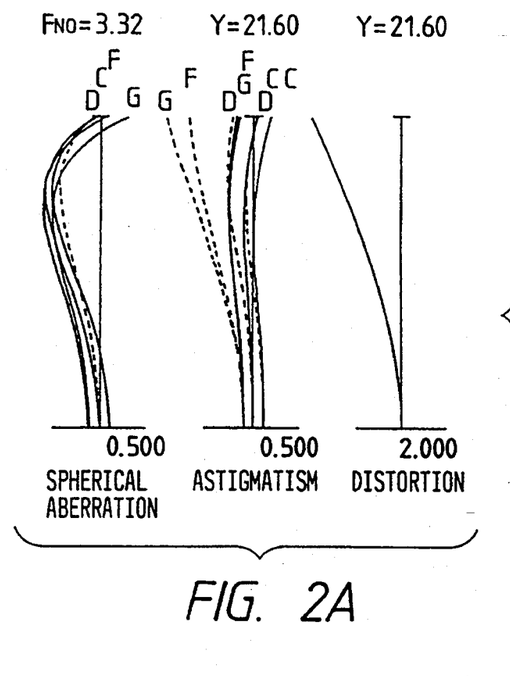
FIGS. 2A to 2D show aberration curves in the wide-angle end (focal length f=36.0) of the first embodiment.
Figure 2B:
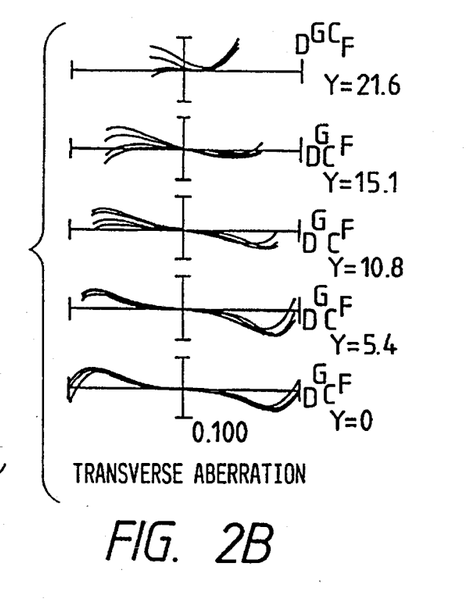
Figure 2C:
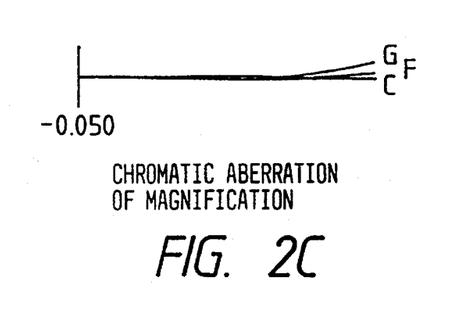
Figure 2D:
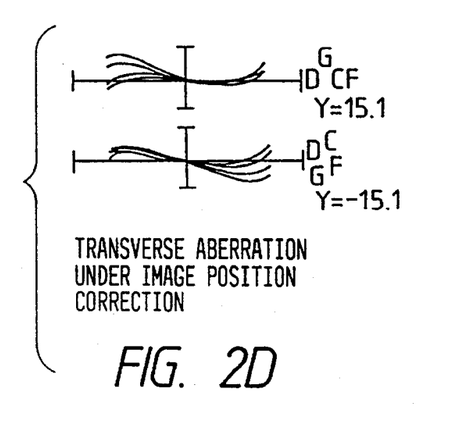
Figure 3A:
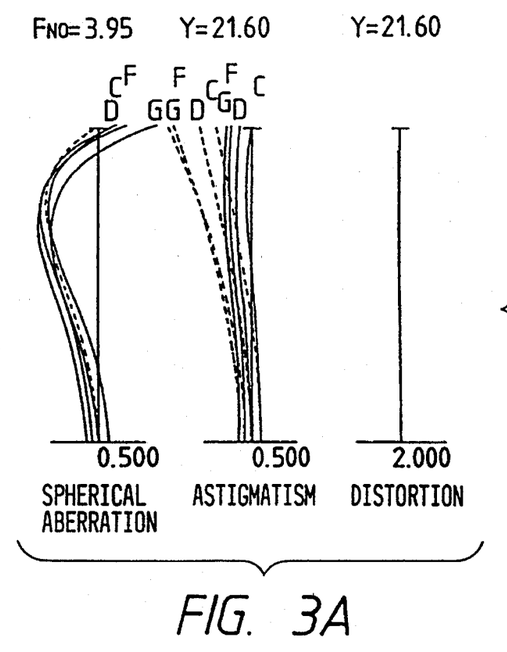
FIGS. 3A to 3D show aberration curves in the intermediate focal length condition (focal length f=51.6) of the first embodiment.
Figure 3B:
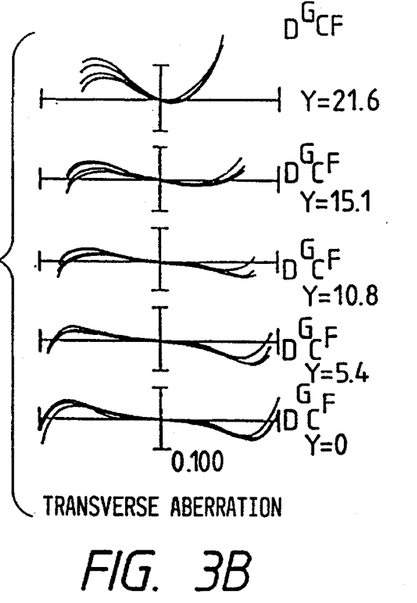
Figure 3C:
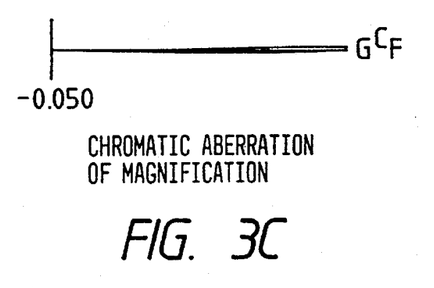
Figure 3D:
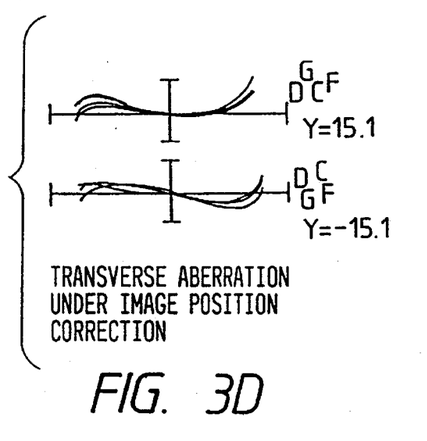
Figure 4A:
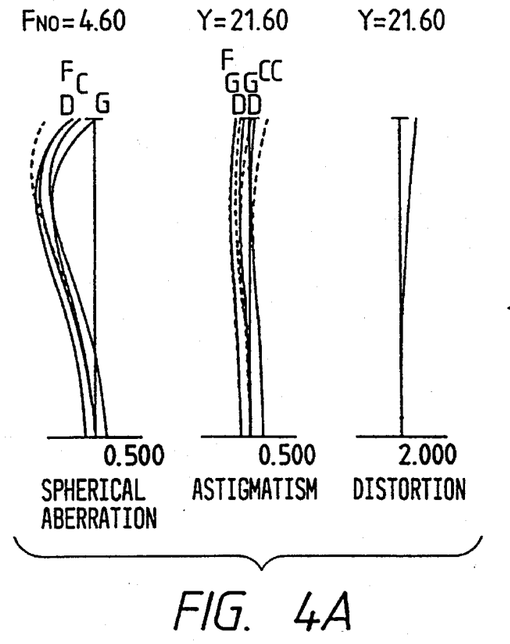
FIGS. 4A to 4D show aberration curves in the telescopic end (focal length f=68.0) of the first embodiment.
Figure 4B:
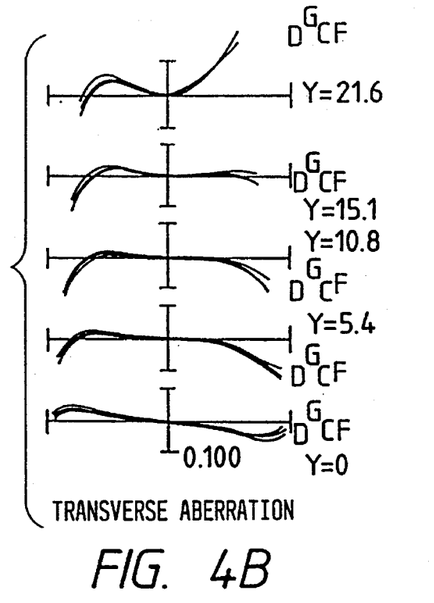
Figure 4C:
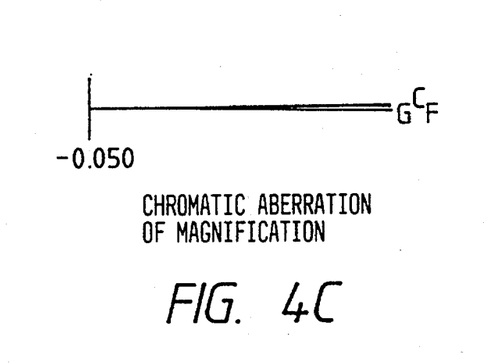
Figure 4D:
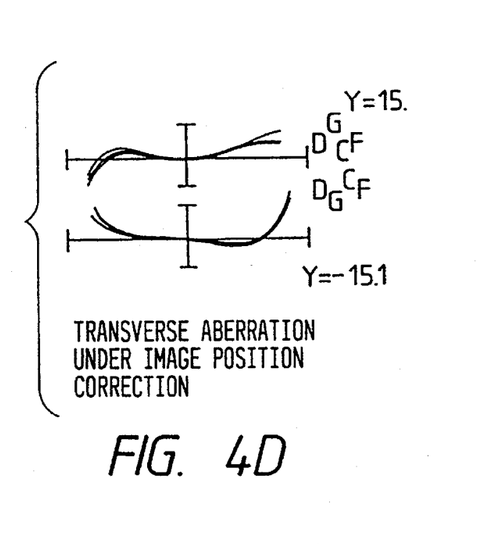

Also, in the zoom lens system of each embodiment of the present invention, the changing means has a vibration detecting device 10 for detecting a deviation of the zoom lens system, a drive device 20 for shifting the front group G21 of the second lens group substantially along the direction perpendicular to the optical axis and a control section 30 for controlling the drive device 20 so as to correct the displacement of an image due to vibrations based on the output from the vibration detecting device 10.

The vibration detecting device 10 detects an amount of rotation of the zoom lens system with the direction perpendicular to the optical axis as an axis. As the vibration detecting device 10, e.g., an angular velocity sensor or an angular acceleration sensor can be utilized. As the drive device 20, a motor, a coreless motor or a piezo element can be utilized. The structures of the vibration detecting device 10, the drive device 20 and the control unit 30 may be those described in U.S. patent application Ser. No. 08/129,580 (filed Sep. 30, 1993) and the description thereof is omitted here by incorporating by reference the disclosure of U.S. patent application Ser. No. 08/129,580.

In the zoom lens system of each embodiment of the present invention, when the axial distance between the first lens group G1 and the second lens group G2 is changed, the magnification of the front group G21 of the second lens group G2 is changed. When the magnification of the front group G21 of the second lens group G2 changes, a relationship between the amount of correction (in the direction perpendicular to the optical axis) of the vibration correcting group and an amount of deviation of the image position caused by the zoom lens system in the direction perpendicular to the optical axis is changed. Therefore, in the zoom lens system of each embodiment of the present invention, an encoder 40 is provided for detecting the position of the first lens group G1 along the optical axis when changing the focal length. The control section 30 is provided with a ROM (Read Only Memory) 35. The ROM 35 stores the relationship between the position of the first lens group G1 along the optical axis, the amount of deviation of the zoom lens system and the amount of correction of the vibration correcting group as a reference table.

Therefore, when the zoom lens system of each embodiment is vibrated, the vibration detecting device 10 detects an amount of rotation of the zoom lens system with the direction perpendicular to the optical axis as the axis and outputs the detected amount to the control section 30. The control section 30, based on the output from the vibration detecting device 10 and the output from the encoder 40, refers to the ROM 35 (reference table) and calculates an amount of correction of the front group G21 (vibration correcting group) of the second lens group G2 in the direction perpendicular to the optical axis. Thereafter, the control section 30 controls the drive device 20 so as to shift the front group G21 for the obtained amount of correction in the direction perpendicular to the optical axis.

In the above, when calculating the amount of correction of the vibration correcting group, the position of the first lens group G1 along the optical axis is detected, but the position of the second lens group G2 along the optical axis may be detected by an encoder. Also, the encoder 40 may be structured to detect the positions of two or more lens groups along the optical axis.

As the encoder 40, e.g., a linear or rotary encoder can be utilized. When a linear encoder is utilized, it is possible to adopt a structure in which the position of the lens group to be detected along the optical axis is directly detected, i.e., a structure in which the position of a member for supporting the lens group is detected. On the other hand, when a rotary encoder is utilized, it is possible to adopt a structure in which an angle of rotation of a member rotating around the optical axis at the time of varying the focal length of the zoom lens, more specifically, an angle of rotation of the lens barrel with cam grooves or the like, is detected.

When the amount of correction of the vibration correcting group is varied in accordance with the object distance, the position of the lens group shifted along the optical axis direction in a focusing operation is detected by, e.g., an encoder. Then, the control section 30 can calculate an amount of correction of the vibration correcting group by referring to the reference table storing the relationship between the output of the encoder, the amount of deviation of the zoom lens system and the amount of correction of the vibration correcting group.

The structure of each embodiment will be described hereinafter.

[FIRST EMBODIMENT]

FIG. 1 shows the structure of the zoom lens system according to the first embodiment of the present invention. The zoom lens system has, in the following order from the object side, a first lens group G1 consisting of a glass plate for protection, a negative meniscus lens element with a convex surface directed to the object side, a biconcave lens element and a positive meniscus lens element with a convex surface directed to the object side, a front group G21 of a second lens group G2 consisting of a biconvex lens element and a cemented lens element formed of a positive meniscus lens element with a convex surface directed to the object side and a negative meniscus lens element with a convex surface directed to the object side, and a rear group G22 of the second lens group G2 consisting of an aperture stop S, a negative meniscus lens element with a concave surface directed to the object side, a negative meniscus lens element with a convex surface directed to the object side and a biconvex lens element.

Also, a fixed stop FS is provided on the image side of the rear group G22 of the second lens group G2.

FIG. 1 shows the positional relationship between the lens groups in the wide-angle end (focal length f=36.0). In a zooming operation to the telescopic end (focal length f=68.0), the first lens group G1 and the second lens group G2 are shifted on the optical axis along the zoom loci as indicated by the arrows in the drawing. Also, the whole front group G21 of the second lens group G2 is shifted by the above-mentioned correcting means in the direction approximately perpendicular to the optical axis. Thereby, fluctuation of the image position due to vibrations of the zoom lens is corrected.

In this embodiment, the image position correction of 0.2 degrees on one side and 0.4 degrees in total on both sides is performed with respect to the deviation in the direction of rotation of the whole zoom lens system. Also, in the focusing operation, the first lens group G1 is shifted toward the object side.

Values of various elements of the first embodiment of the present invention are shown in the following Table 1. In the Table 1, f, $F_{NO}$, $2\omega$ and Bf represent the focal length, F-number, angle of view and back focus respectively. Further, left end figures indicate the order of the respective lens surfaces from the object side. r represents the radius of curvature and d represents the distance between the adjacent lens surfaces. n and ν, respectively represent the refractive index and Abbe number with respect to d-line ($\lambda$=587.6 nm).

"Vibration correction data" in the Table 1 shows the relationship between the amount of correction of the vibration correcting group (the front group G21 of the second lens group G2) in the direction perpendicular to the optical axis and the shift amount of an image on the image surface in the same direction when the zoom lens system is rotated 0.2 degrees with the direction perpendicular to the optical axis as an axis.

TABLE 1 f = 36.0 – 68.0
$F_{NO}$ = 3.32 – 4.60
2ω = 62.0° – 35.2°

| | r | d | ν | n |
|---|---|---|---|---|
| 1 | ∞ | 2.000 | 58.74 | 1.52216 |
| 2 | ∞ | 1.200 | | |
| 3 | 33.177 | 1.700 | 50.188 | 1.72000 |
| 4 | 16.693 | 7.400 | | |
| 5 | –113.680 | 1.200 | 50.188 | 1.72000 |
| 6 | 49.947 | 0.400 | | |
| 7 | 28.363 | 3.600 | 31.623 | 1.75692 |
| 8 | 130.696 | (d8 = variable) | | |
| 9 | 37.413 | 2.500 | 60.140 | 1.62041 |
| 10 | –64.669 | 0.100 | | |
| 11 | 16.727 | 4.100 | 58.497 | 1.65160 |
| 12 | 325.097 | 1.100 | 38.183 | 1.65128 |
| 13 | 17.000 | 2.500 | | |
| 14 | ∞ | 1.500 | | |
| 15 | –23.459 | 1.400 | 28.341 | 1.72825 |
| 16 | –60.009 | 0.100 | | |
| 17 | 139.184 | 1.400 | 28.341 | 1.72825 |
| 18 | 21.995 | 1.283 | | |
| 19 | 47.830 | 2.600 | 36.270 | 1.62004 |
| 20 | –23.035 | 1.500 | | |
| 21 | ∞ | (Bf) | | |

(variable distance at the time of varying focal length)

| f | 36.0 | 51.6 | 68.0 |
|---|---|---|---|
| d8 | 23.261 | 8.565 | 0.386 |
| Bf | 43.690 | 54.610 | 66.090 |

(values corresponding to conditions)

$\phi 2$ = 1/35.0
$\phi 21$ = 1/29.196
R1 = 17
D = 2.5
condition (1)  $\phi 2/\phi 21$ = 0.83
condition (2)  D/R1 = 0.15

(vibration correction data)

| focal length f | 36.0 | 51.6 | 68.0 |
|---|---|---|---|
| shift amount of vibration correcting group (mm) | 0.0637 | 0.0778 | 0.0888 |
| shift amount of image (mm) | 0.126 | 0.180 | 0.237 |

FIGS. 2A to 2D are graphs showing respectively longitudinal aberrations, transverse aberrations and a chromatic aberration of magnification in the wide-angle end (focal length f=36.0) and transverse aberrations when the image position is corrected by shifting the vibration correcting group. FIGS. 3A to 3D are graphs showing, respectively, longitudinal aberrations, transverse aberrations and a chromatic aberration of magnification in the intermediate focal length condition (focal length f=51.6) and transverse aberrations when the image position is corrected by shifting the vibration correcting group. FIGS. 4A to 4D are graphs showing, respectively, longitudinal aberrations, transverse aberrations and a chromatic aberration of magnification in the telescopic end (focal length f=68.0) and transverse aberrations when the image position is corrected by shifting the vibration correcting group. In each aberration graph, $F_{NO}$, Y, D, C, F and G are F-number, the height of the image, d-line (λ=587.6 nm), C-line (λ=656.3 nm), F-line (λ=486.1 nm) and g-line (λ=435.6 nm), respectively.

In the graphs showing the astigmatism, the solid lines indicate sagittal image surfaces and broken lines indicate meridional image surfaces. In the graphs of the spherical aberrations, broken lines indicate the sine condition and the graphs of the chromatic aberrations of magnification are shown based on the d-line. Further, the graphs of the transverse aberrations under the image position correction are formed when the whole zoom lens system is displaced toward each side (clockwise, counterclockwise) 0.2 degrees in the direction of rotation with the direction perpendicular to the optical axis as the axis.

As is apparent from the respective aberration graphs, the various aberrations are corrected preferably in this embodiment at the time of the vibration correcting operation included.

[SECOND EMBODIMENT]

Figure 5:
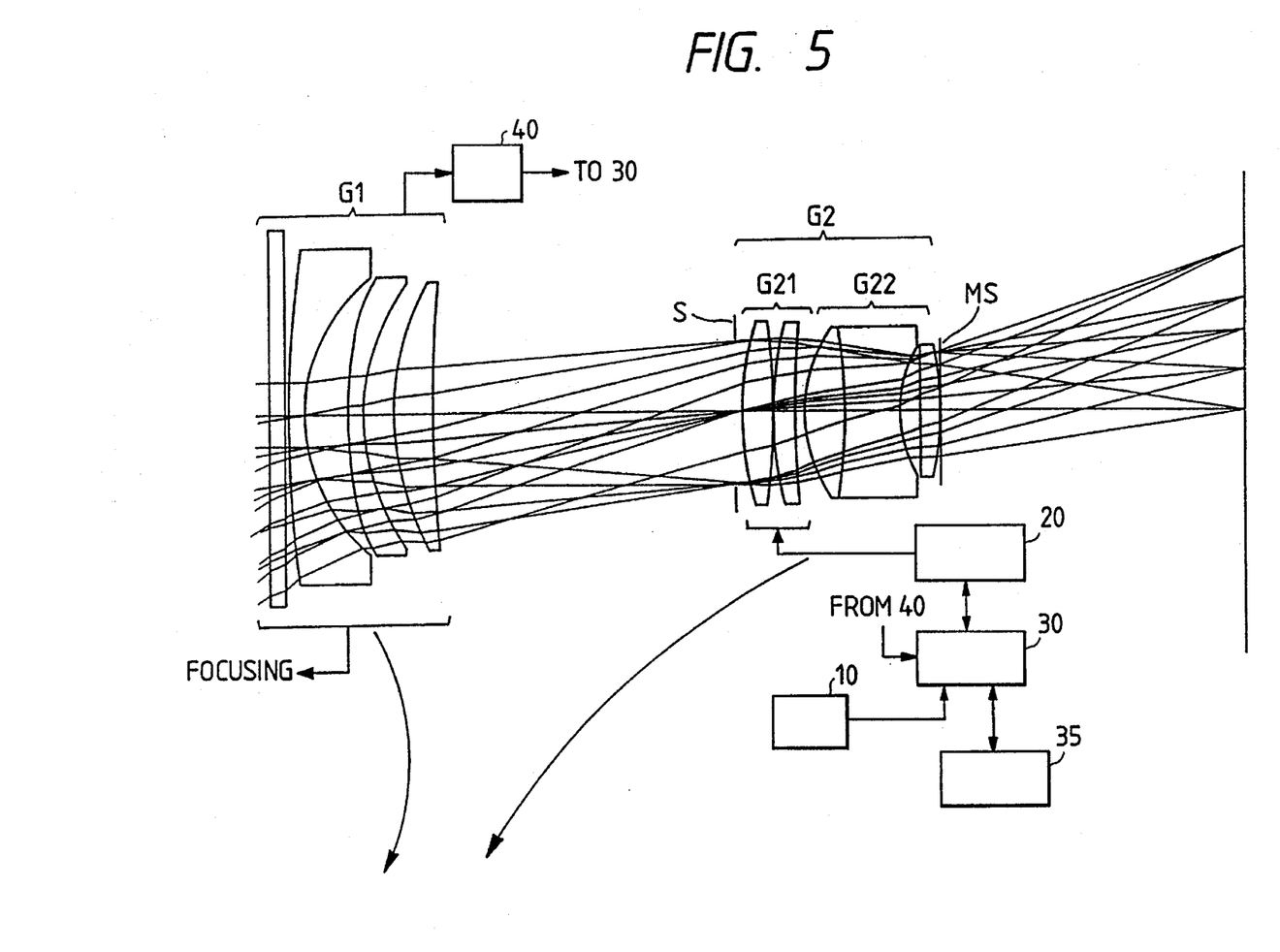
FIG. 5 shows the structure of a zoom lens system according to a second embodiment of the present invention.
Figure 6A:
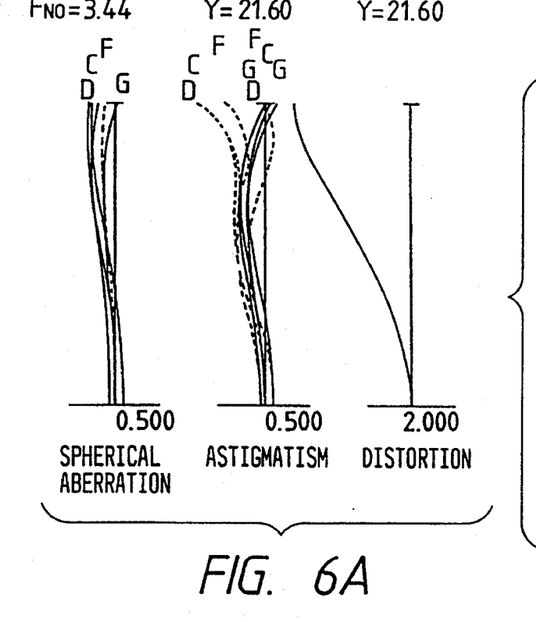
FIGS. 6A to 6D show aberration curves in the wide-angle end (focal length f=28.8) of the second embodiment.
Figure 6B:
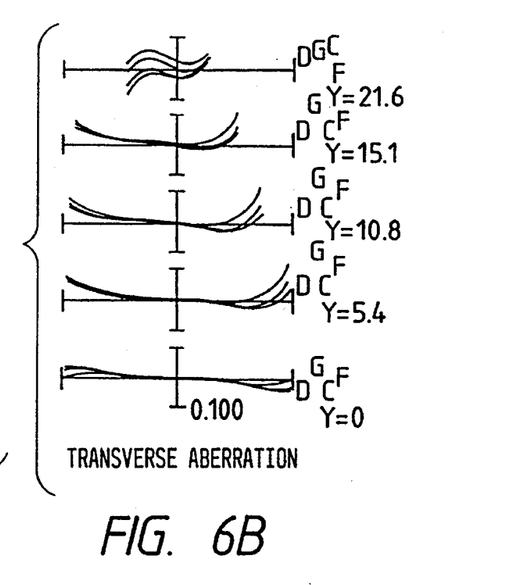
Figure 6C:
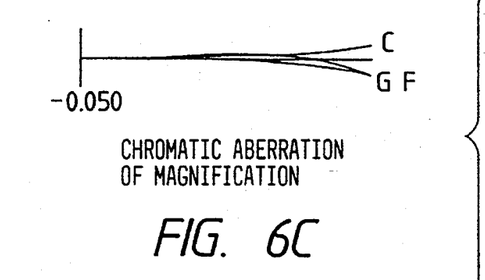
Figure 6D:
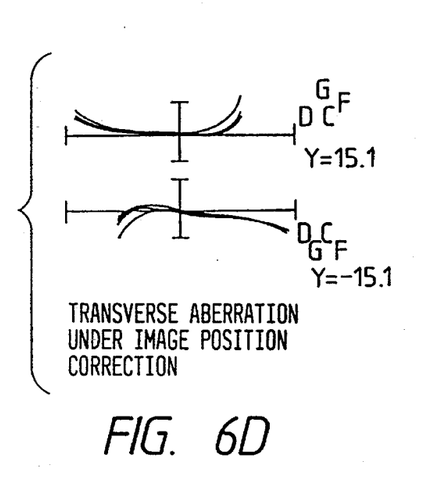
Figure 7A:
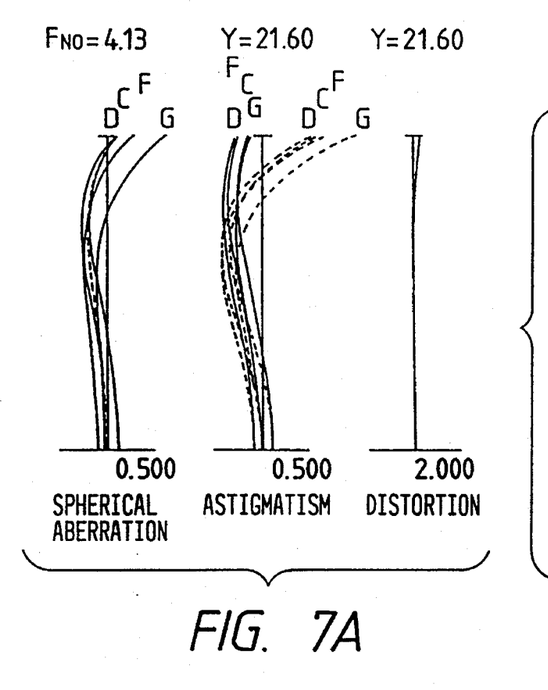
FIGS. 7A to 7D show aberration curves in the intermediate focal length condition (focal length f=50.0) of the second embodiment.
Figure 7B:
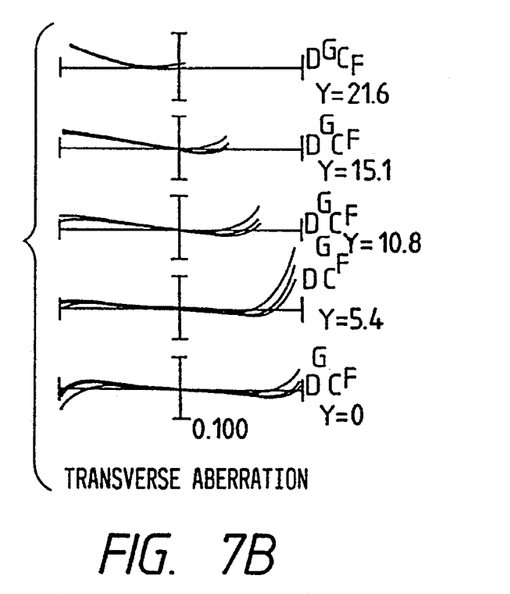
Figure 7C:
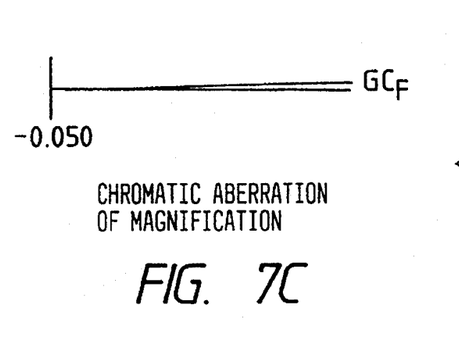
Figure 7D:
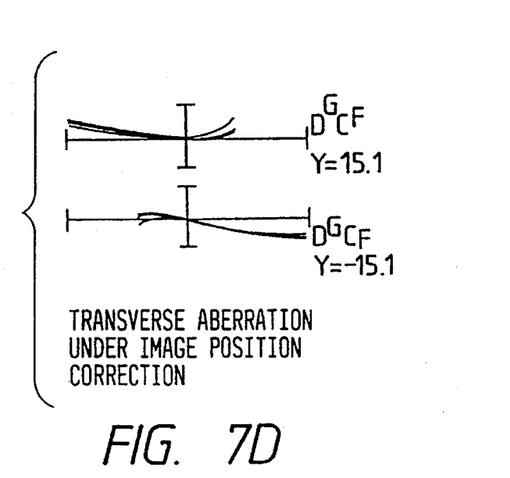
Figure 8A:
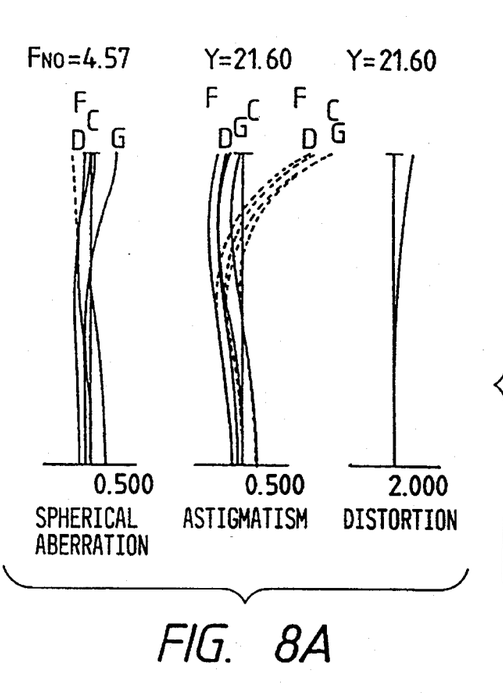
FIGS. 8A to 8D show aberration curves in the telescopic end (focal length f=68.0) of the second embodiment.
Figure 8B:
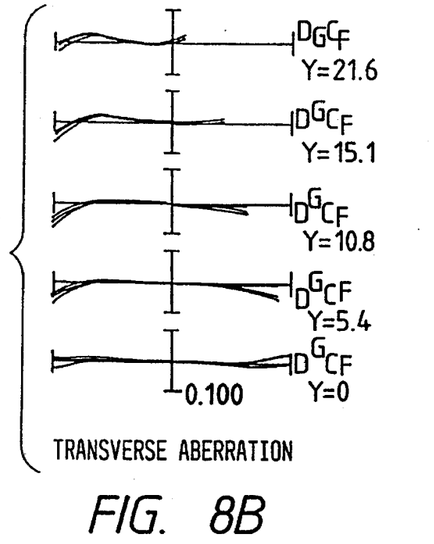
Figure 8C:
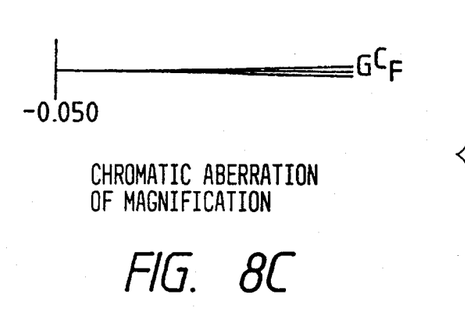
Figure 8D:
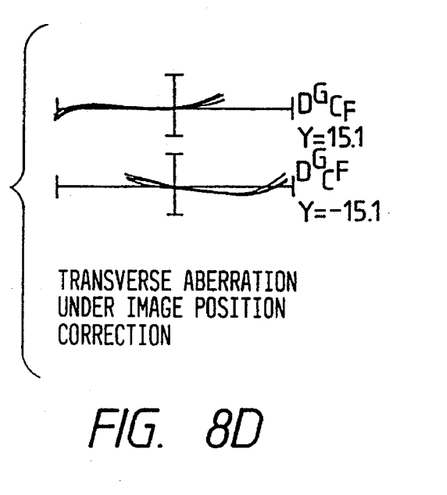

FIG. 5 shows the structure of a zoom lens system according to a second embodiment of the present invention.

The zoom lens system has, in the following order from the object side, a first lens group G1 consisting of a glass plate for protection, a negative meniscus lens element with a convex surface directed to the object side, a negative meniscus lens element with a convex aspherical surface directed to the object side and a positive meniscus lens element with a convex surface directed to the object side, a front group G21 of a second lens group G2 consisting of an aperture stop S, a biconvex lens element and a positive meniscus lens element with a convex surface directed to the object side and a rear group G22 of the second lens group G2 consisting of a cemented lens element formed of a biconvex lens element and a biconcave lens element, and a biconvex lens element.

A field stop MS movable in the optical axis direction is provided on the image side of the rear group G22 of the second lens group G2.

FIG. 5 shows the positional relationship between the lens groups in the wide-angle end (focal length f=28.8). When the focal length is changed toward the telescopic end (focal length f=68.0), the first lens group G1 and the second lens group G2 are shifted on the optical axis along loci as indicated by arrows in the drawing. The field stop MS is also shifted in the optical axis direction. Further, the whole front group G21 of the second lens group is shifted by the above-mentioned correcting means in the direction perpendicular to the optical axis. Thereby, fluctuation of the image position due to vibrations of the zoom lens is corrected.

In this embodiment, the image position correction of 0.2 degrees on one side and 0.4 degrees in total on both sides is performed with respect to a deviation of the whole zoom lens system in the direction of rotation thereof. In the focusing operation, the first lens group G1 is shifted toward the object side.

Although the zoom lens system of the second embodiment has a similar structure to the first embodiment, the refractive powers and shapes of the lens groups are different from those of the lens groups in the first embodiment.

Values of various elements of the second embodiment of the present invention is shown in the following Table 2. In the Table 2, f, $F_{NO}$, 2ω and Bf represent the focal length, F-number, angle of view and back focus, respectively. Further, left end figures indicate the order of the respective lens surfaces from the object side. r represents the radius of curvature and d represents the distance between the adjacent lens surfaces. n and ν, respectively, represent the refractive index and Abbe number with respect to d-line (λ=587.6 nm).

If the height of the aspherical surface in the perpendicular direction to the optical axis is y, and the amount of change in height y in the optical axis direction is S(y), the basic radius of curvature is R, a conic coefficient is k, and the aspherical coefficient of the n-th degree is $C_n$, the aspherical surface is expressed as:

$$S(y)=(y^2/R)/[1+(1-k\cdot y^2/R^2)^{1/2}]+C_2\cdot y^2+C_4\cdot y^4+C_6\cdot y^6+C_8\cdot y^8+C_{10}\cdot y^{10}+ \ldots \quad (a)$$

Also, the paraxial radius r of curvature of the aspherical surface is defined by the following equation (b):

$$r=1/(2\cdot C_2+1/R) \quad (b)$$

In the Table 2, the aspherical surface is indicated by an asterisk mark (*) attached on the right side of the surface number.

Also, "Vibration correction data" in the Table 2 shows the relationship between the amount of correction of the vibration correcting group (the front group G21 of the second lens group G2) in the direction perpendicular to the optical axis and the shift amount of an image on the image surface in the same direction when the zoom lens system is rotated 0.2 degrees with the direction perpendicular to the optical axis as an axis.

TABLE 2 f = 28.8 – 68.0
$F_{NO}$ = 3.44 – 4.57
2ω = 73.7° – 35.2°

| | r | d | ν | n |
|---|---|---|---|---|
| 1 | ∞ | 2.000 | 64.12 | 1.51680 |
| 2 | ∞ | 0.700 | | |
| 3 | 166.620 | 1.800 | 49.44 | 1.77279 |
| 4 | 22.658 | 5.800 | | |
| *5 | 66.081 | 2.000 | 56.46 | 1.50137 |
| 6 | 87.945 | 4.100 | | |
| 7 | 33.728 | 5.400 | 31.15 | 1.68893 |
| 8 | 167.208 | (d8 = variable) | | |
| 9 | ∞ | 0.750 | | |
| 10 | 42.441 | 4.000 | 70.24 | 1.48749 |
| 11 | –102.151 | 0.100 | | |
| 12 | 45.311 | 3.100 | 70.24 | 1.48749 |
| 13 | 169.942 | 1.000 | | |
| 14 | 18.696 | 5.500 | 65.79 | 1.46450 |
| 15 | –78.099 | 7.100 | 33.89 | 1.80384 |
| 16 | 16.734 | 2.600 | | |
| 17 | 284.772 | 3.000 | 42.69 | 1.56732 |
| 18 | –33.969 | (d18 = variable) | | |
| 19 | ∞ | (Bf) | | |

(variable distance at the time of varying focal length)

| f | 28.8 | 50.0 | 68.0 |
|---|---|---|---|
| d8 | 40.647 | 11.428 | 0.921 |
| d18 | –0.210 | 8.800 | 11.800 |
| Bf | 41.100 | 48.588 | 59.596 |

(aspherical surface data)

| 5th surface | k | $C_2$ | $C_4$ |
|---|---|---|---|
| | 1.0000 | 0.0000 | $0.78690 \times 10^{-5}$ |
| | $C_6$ | $C_8$ | $C_{10}$ |
| | $0.55300 \times 10^{-8}$ | $0.15710 \times 10^{-10}$ | $0.50930 \times 10^{-13}$ |

(values corresponding to conditions)

$\phi 2$ = 1/39.3
$\phi 21$ = 1/41.835
R1 = 169.9417
D = 7.95
condition (1) $\phi 2/\phi 21$ = 1.0649
condition (2) D/R1 = 0.047

(vibration correction data)

| focal length f | 28.8 | 50.0 | 68.0 |
|---|---|---|---|
| shift amount of vibration correcting group (mm) | 0.0651 | 0.0875 | 0.0995 |
| shift amount of | 0.101 | 0.175 | 0.237 |

TABLE 2-continued f = 28.8 – 68.0
$F_{NO}$ = 3.44 – 4.57
2ω = 73.7° – 35.2° image (mm)

FIGS. 6A to 6D are graphs showing respectively longitudinal aberrations, transverse aberrations and a chromatic aberration of magnification in the wide-angle end (focal length f=28.8) and transverse aberrations when the image position is corrected by shifting the vibration correcting group. FIGS. 7A to 7D are graphs showing, respectively, longitudinal aberrations, transverse aberrations and a chromatic aberration of magnification in the intermediate focal length condition (focal length f=50.0) and transverse aberrations when the image position is corrected by shifting the vibration correcting group. FIGS. 8A to 8D are graphs showing, respectively, longitudinal aberrations, transverse aberrations and a chromatic aberration of magnification in the telescopic end (focal length f=68.0) and transverse aberrations when the image position is corrected by shifting the vibration correcting group. In each aberration graph, $F_{NO}$, Y, D, C, F and G are F-number, the height of the image, d-line (λ=587.6 nm), C-line (λ=656.3 nm), F-line (λ=486.1 nm) and g-line (λ=435.6 nm), respectively.

In the graphs showing the astigmatism, the solid lines indicate sagittal image surfaces and broken lines indicate meridional image surfaces. In the graphs of the spherical aberrations, broken lines indicate the sine condition and the graphs of the chromatic aberrations of magnification are shown based on the d-line. Further, the graphs of the transverse aberrations under the image position correction are formed when the whole zoom lens system is displaced toward each side (clockwise, counterclockwise) 0.2 degrees in the direction of rotation with the direction perpendicular to the optical axis as the axis.

As is apparent from the respective aberration graphs, the various aberrations are corrected preferably in this embodiment at the time of the vibration correcting operation.

Although the whole front group G21 of the second lens group G2 is shifted by the correcting means (the vibration detecting device 10, the drive device 20 and the control section 30) in the direction approximately perpendicular to the optical axis so as to correct fluctuation of the image position due to vibrations of the zoom lens system in each above embodiment, only a portion of the front group G21 of the second lens group may be made as the vibration correcting group so as to correct fluctuation of the image position due to vibrations of the zoom lens system. For example, in the zoom lens system of the first embodiment shown in FIG. 1, one of the biconvex lens element of the front group G21 and the cemented lens element of the front group G21 can be shifted in the direction perpendicular to the optical axis so as to correct fluctuation of the image position due to vibrations of the zoom lens system. Also, in the zoom lens system of the second embodiment shown in FIG. 5, one of the biconvex lens element of the front group G21 and the positive meniscus lens element with the convex surface directed to the object side of the front group G21 can be shifted in the direction perpendicular to the optical axis so as to correct fluctuation of the image position due to vibrations of the zoom lens system.

In each above embodiment, the focusing operation is performed by the first lens group G1, but may be performed by the whole second lens group G2 or a portion of the second lens group G2. Further, needless to say, the focusing operation may be performed by shifting the whole zoom lens toward the object side.

In the zoom lens system of each embodiment, the front group G21 of the second lens group G2 is small in size, so that a space necessary for the vibration correcting mechanism can be secured sufficiently. Therefore, the miniaturization of the photo-optical system in the end product condition can be achieved.

Further, in the zoom lens system in each above embodiment, as the vibration correcting group is small in size and light in weight, the load of the drive device (actuator) for driving it can be reduced, thereby enabling the miniaturization of the actuator and reduction of the power consumption.

Each above embodiment is for the purpose of clarifying technical contents of the present invention and the present invention is not limited thereto.

What is claimed is:

1. A zoom lens system capable of correcting an image position, comprising, in the following order from an object side:

a first lens group with a negative refractive power; and a second lens group with a positive refractive power, said second lens group having, in the following order from the object side, a front group with a positive refractive power and a rear group with a negative refractive power, wherein a distance of an air space between said first lens group and said second lens group along an optical axis of said zoom lens system changes when changing a focal length of said zoom lens system, said second lens group moves integrally when changing said focal length, and at least one lens element of said front group of said second lens group shifts along a direction transverse to said optical axis to change said image position.

2. A zoom lens system according to claim 1, further comprising a detector that detects a deviation of said image position on an image surface of said zoom lens and a shift device that corrects said image position by driving said at least one lens element based on an output of said detector.

3. A zoom lens system according to claim 2, wherein said shift device drives all lens elements constituting said front group of said second lens group.

4. A zoom lens system according to claim 3, wherein said rear group of said second lens group corrects higher-order aberrations occurring in said first lens group.

5. A zoom lens system according to claim 1, wherein an aperture stop is disposed in a light path between said first lens group and said rear group of said second lens group.

6. A zoom lens system according to claim 5, wherein, when a radius of curvature of a lens surface of said front group of said second lens group located closest to an image side is R1 and an axial distance between said aperture stop and said lens surface closest to the image side is D, the following condition is satisfied:

$$0.01 < D/R1 < 0.2.$$

7. A zoom lens system according to claim 6, wherein said aperture stop is fixed in a direction approximately perpendicular to said optical axis.

8. A zoom lens system according to claim 1, wherein, when a refractive power of said whole second lens group is $\phi 2$ and a refractive power of said front group of said second lens group is $\phi 21$, the following condition is satisfied:

$$0.5 < \phi 2/\phi 21 < 1.5.$$

9. A zoom lens system according to claim 1, wherein a fixed stop is disposed in a light path on an image side of said rear group of said second lens group.

10. A zoom lens system according to claim 9, wherein said fixed stop is shifted along said optical axis in accordance with the movement of said second lens group when changing said focal length.

11. A zoom lens system according to claim 10, wherein said fixed stop is fixed in a direction approximately perpendicular to said optical axis.

12. A zoom lens system according to claim 1, wherein said first lens group is shiftable along said optical axis during a focusing operation.

13. A zoom lens system according to claim 1, wherein at least one lens element of said second lens group is shiftable along said optical axis during a focusing operation.

14. A zoom lens system capable of correcting an image position, comprising, in the following order from an object side:

a first lens group with a negative refractive power;

a second lens group with a positive refractive power, said second lens group having, in the following order from the object side, a front group with a positive refractive power and a rear group with a negative refractive power, wherein a distance of an air space between said first lens group and said second lens group along an optical axis of said zoom lens system changes when changing a focal length of said zoom lens system and said second lens group moves integrally when changing said focal length;

a detector that detects a deviation of said image position on an image surface of said zoom lens; and a shift device that corrects said image position by driving at least one lens element of said front group of said second lens group along a direction transverse to said optical axis based on an output of said detector.

15. A zoom lens system according to claim 14, wherein an aperture stop is disposed in a light path between said first lens group and said rear group of said second lens group.

16. A zoom lens system according to claim 15, wherein, when a radius of curvature of a lens surface of said front group of said second lens group located closest to an image side is R1 and an axial distance between said aperture stop and said lens surface closest to the image side is D, the following condition is satisfied:

$$0.01 < D/R1 < 0.2.$$

17. A zoom lens system according to claim 16, wherein a fixed stop is disposed in a light path on the image side of said rear group of said second lens group.

18. A zoom lens system according to claim 17, wherein said fixed stop is shifted along said optical axis in accordance with the movement of said second lens group when changing said focal length.

19. A zoom lens system according to claim 18, wherein said aperture stop and said fixed stop are fixed in a direction perpendicular to said optical axis.

20. A zoom lens system according to claim 14, wherein when a refractive power of said whole second lens group is $\phi 2$ and a refractive power of said front group of said second lens group is $\phi 21$, the following condition is satisfied:

$$0.5 < \phi 2/\phi 21 < 1.5.$$

21. A zoom lens system according to claim 14, further comprising at least one aspherical lens surface.

* * * * *